United States Patent
Zhang et al.

(10) Patent No.: US 12,413,113 B2
(45) Date of Patent: Sep. 9, 2025

(54) STATOR HAVING A WIRE WITH A SLACKENED PORTION

(71) Applicants: TE Connectivity Solutions GmbH, Schaffhausen (CH); TE Connectivity Belgium BV, Oostkamp (BE); TE Sensores, S. De R.L. DE C.V., Sonora (MX); Tyco Electronics (Suzhou) Ltd., Suzhou (CN)

(72) Inventors: Xingzhe Zhang, Winston Salem, NC (US); Tom Ocket, Oostkamp (BE); Oscar Sosa, Tlalnepantla (MX); Zhiliu Xiao, Suzhou (CN)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 296 days.

(21) Appl. No.: 18/163,322

(22) Filed: Feb. 2, 2023

(65) Prior Publication Data

US 2024/0266899 A1    Aug. 8, 2024

(51) Int. Cl.
*H02K 3/52*   (2006.01)
*H02K 15/32*  (2025.01)
*H02K 24/00*  (2006.01)

(52) U.S. Cl.
CPC ............. *H02K 3/522* (2013.01); *H02K 15/32* (2025.01); *H02K 24/00* (2013.01)

(58) Field of Classification Search
CPC ........ H02K 3/522; H02K 15/32; H02K 24/00; G01D 5/20
USPC .......................................................... 310/71
See application file for complete search history.

(56) References Cited

U.S. PATENT DOCUMENTS

| | | | |
|---|---|---|---|
| 6,031,307 | A | 2/2000 | Ohshita |
| 7,093,344 | B2 | 8/2006 | Miya et al. |
| 7,159,296 | B2 | 1/2007 | Miya et al. |
| 7,356,910 | B2 | 4/2008 | Akutsu et al. |
| 7,635,933 | B2 | 12/2009 | Makino et al. |
| 7,755,231 | B2 | 7/2010 | Kataoka et al. |

FOREIGN PATENT DOCUMENTS

| | | | | |
|---|---|---|---|---|
| JP | 62202050 U | * | 12/1987 | |
| JP | 2009095177 A | * | 4/2009 | |
| JP | 2010-183735 A | | 8/2010 | |
| JP | 20144225943 A | * | 12/2014 | |
| WO | WO-2018150968 A1 | * | 8/2018 | F04D 13/06 |

* cited by examiner

Primary Examiner — Jose A Gonzalez Quinones

(57) ABSTRACT

A stator of a resolver includes a body having a pole, a connector interface disposed in a portion of the body and including a terminal having a wire termination at a termination end, and a wire disposed around the pole and extending to the termination end of the terminal. The terminal has a bent section at the termination end that is bent to a bending angle greater than 0° and less than or equal to 90° with respect to a main section of the terminal. The wire is electrically and mechanically connected with the terminal at the wire termination. The bent section of the terminal forms a slackened portion of the wire adjacent to the wire termination.

17 Claims, 9 Drawing Sheets

STATOR HAVING A WIRE WITH A SLACKENED PORTION

FIELD OF THE INVENTION

The present invention relates to a stator of a resolver and, more particularly, to tension of a wire of the stator.

BACKGROUND

A resolver generally includes a stator and rotor disposed within the stator. The stator determines a rotational position of the rotor using wires wound around a plurality of poles that face the rotor. Each of the wires extends from one of the poles to a terminal of the stator. The wire is in tension and generally taut when it is connected to the terminal.

Resolvers can be subject to harsh environments in various applications. Rapid temperature change, for example, in these harsh environments causes strain on the tensioned wire that can result in breakage of the wire.

Some resolvers provide strain relief to the wires of the stator in order to avoid damage to or breakage of the wire under harsh conditions. These resolvers commonly include an external element that is placed on the stator and is in contact with the wires when the wires are connected in tension to the terminals; the external element is then removed to allow for slack in the wires that can compensate for temperature change. These solutions, however, require additional process steps and are time consuming to implement, while also requiring additional components that increase the cost of material and the cost of production. Further, removing the external element can cause damage to the wires.

SUMMARY

A stator of a resolver includes a body having a pole, a connector interface disposed in a portion of the body and including a terminal having a wire termination at a termination end, and a wire disposed around the pole and extending to the termination end of the terminal. The terminal has a bent section at the termination end that is bent to a bending angle greater than 0° and less than or equal to 90° with respect to a main section of the terminal. The wire is electrically and mechanically connected with the terminal at the wire termination. The bent section of the terminal forms a slackened portion of the wire adjacent to the wire termination.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
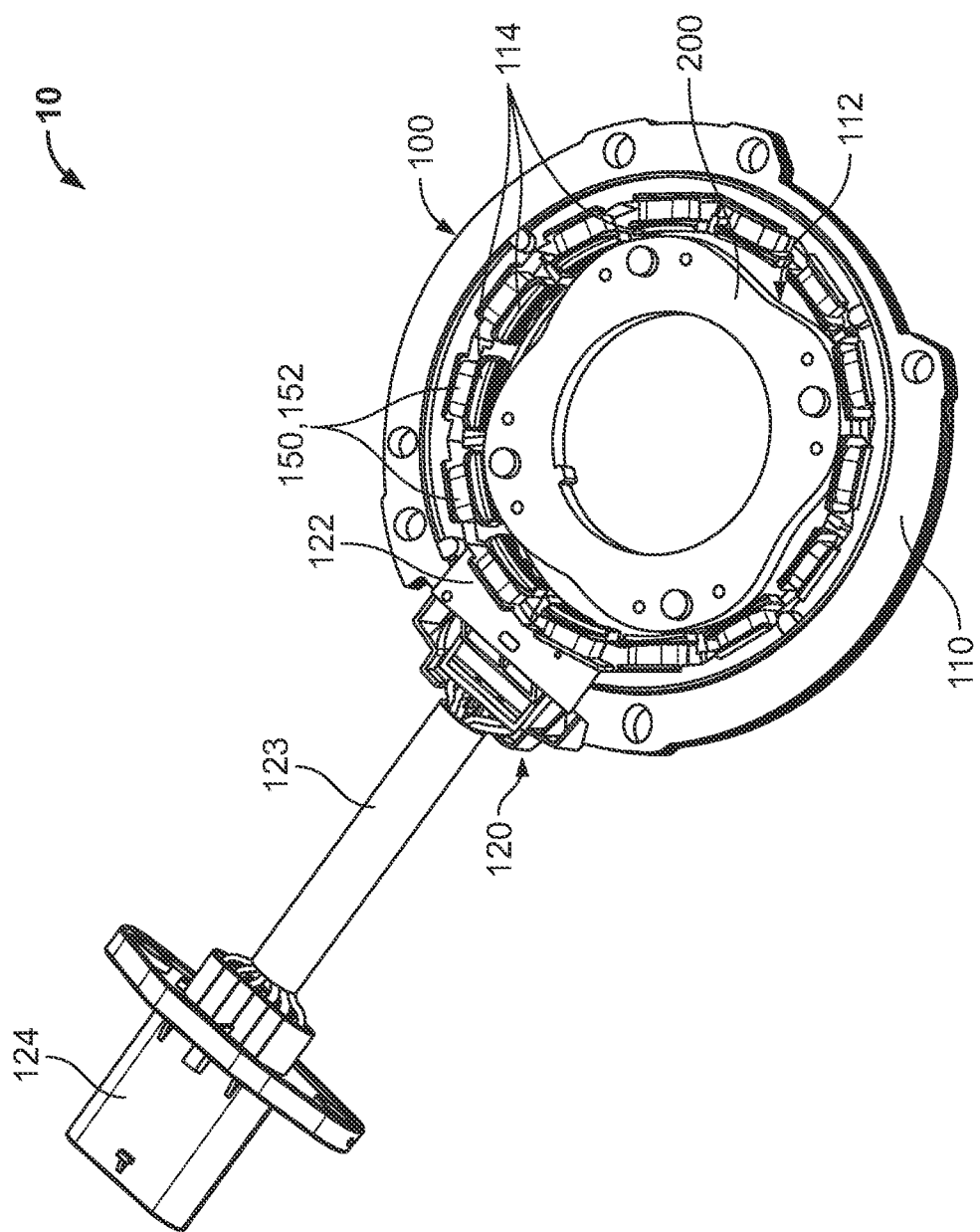
FIG. 1 is a perspective view of a resolver according to an embodiment.

Exemplary embodiments of the present disclosure will be described hereinafter in detail with reference to the attached drawings, wherein like reference numerals refer to like elements. The present disclosure may however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "vertical", "longitudinal", and "width". These descriptors are merely for clarity of the description and for differentiation of the various directions. These directional descriptors do not imply or require any particular orientation of the disclosed elements.

A resolver 10 according to an embodiment is shown in FIG. 1. The resolver 10 includes a stator 100 and a rotor 200 disposed within the stator 100. The rotor 200 is rotatable with respect to the stator 100 and the stator 100 has an output indicating a rotational position and/or a rotation speed of the rotor 200.

Figure 2:
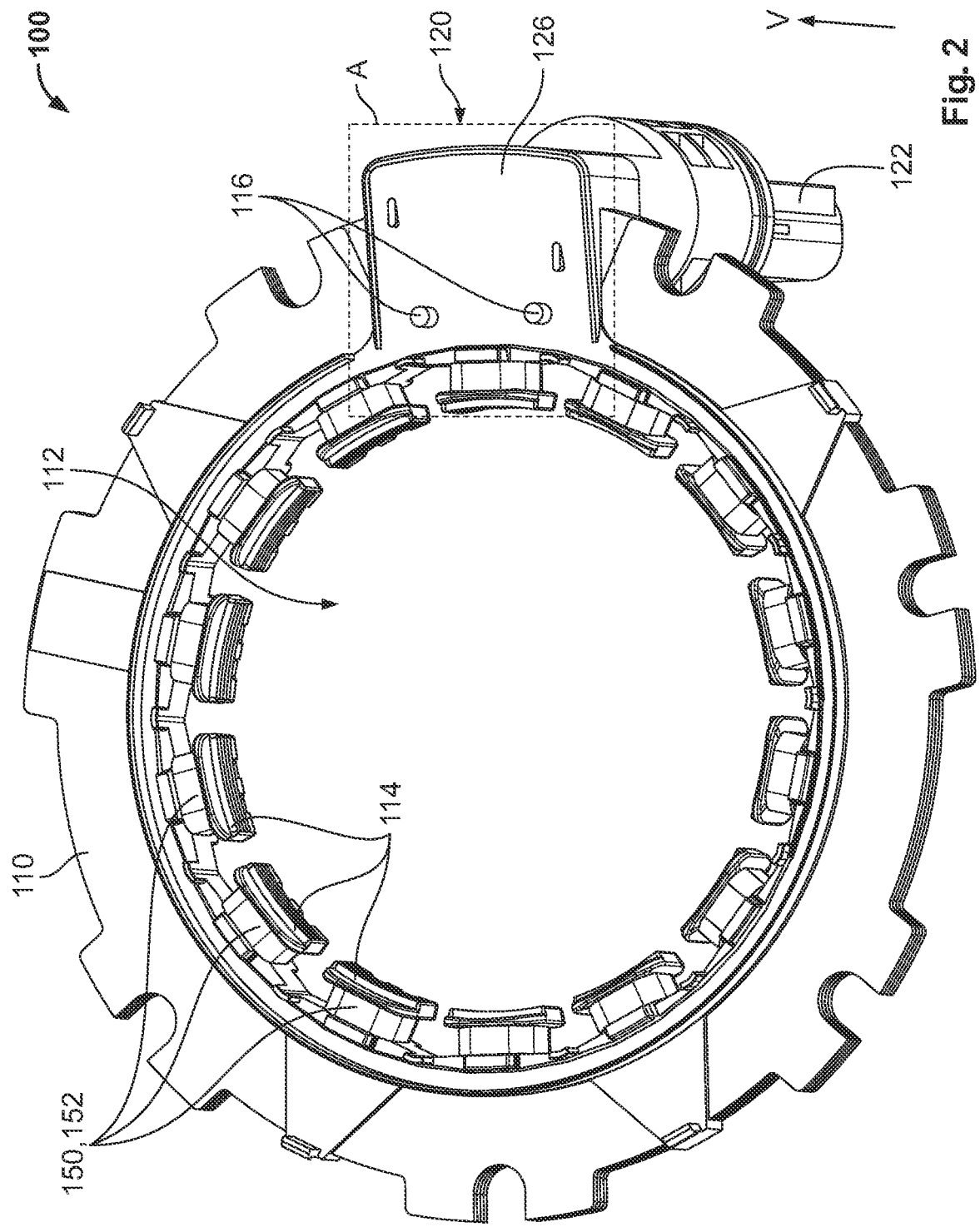
FIG. 2 is a perspective view of a stator of a resolver according to an embodiment.

The stator 100 is shown in multiple embodiments in FIGS. 1 and 2. In each embodiment, the stator 100 includes a body 110, a connector interface 120 disposed in a portion of the body 110, and a plurality of wires 150 extending from the body 110 to the connector interface 120.

As shown in FIGS. 1 and 2, the body 110 is an approximately circular member defining a rotor receiving space 112. The rotor 200 is disposed in the rotor receiving space 112. The body 110 has a plurality of poles 114 positioned around a circumference of the rotor receiving space 112 and facing into the rotor receiving space 112. The poles 114 are positioned at a regular interval around the circumference and are spaced apart from one another. The body 110 has a pair of posts 116, shown in FIGS. 2 and 3, extending in a vertical direction V and positioned adjacent to or within the connector interface 120.

Figure 3:
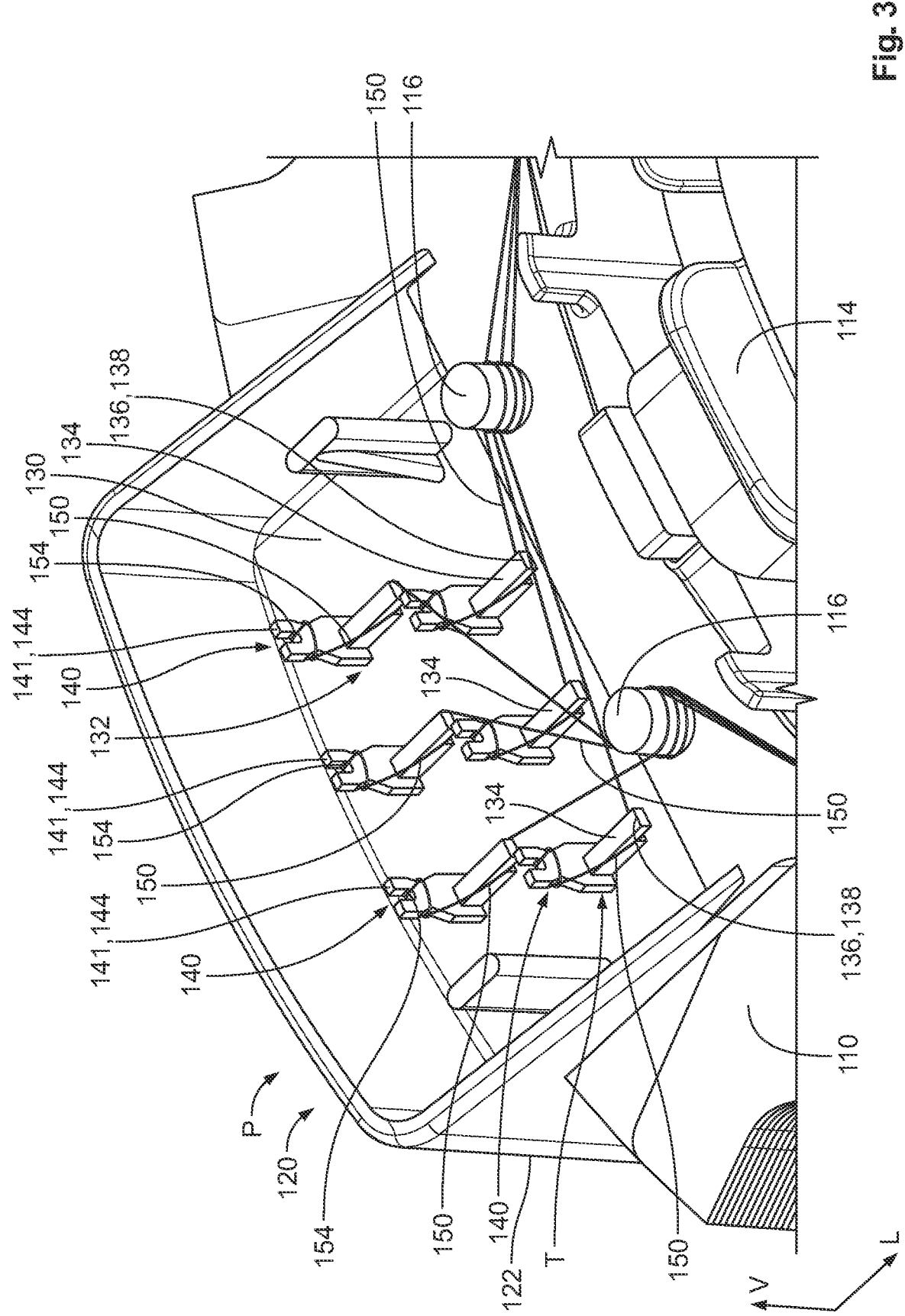
FIG. 3 is a detail perspective view of a portion A of FIG. 2 without a cover.

The connector interface 120 is shown generally in the embodiments of FIGS. 1 and 2, and a detail view of a portion A of FIG. 2 including the connector interface 120 is shown in FIG. 3. The connector interface 120 includes a connector housing 122, a terminal base 130 disposed within the connector housing 122, and a plurality of terminals 140 disposed within the terminal base 130.

Figure 4:
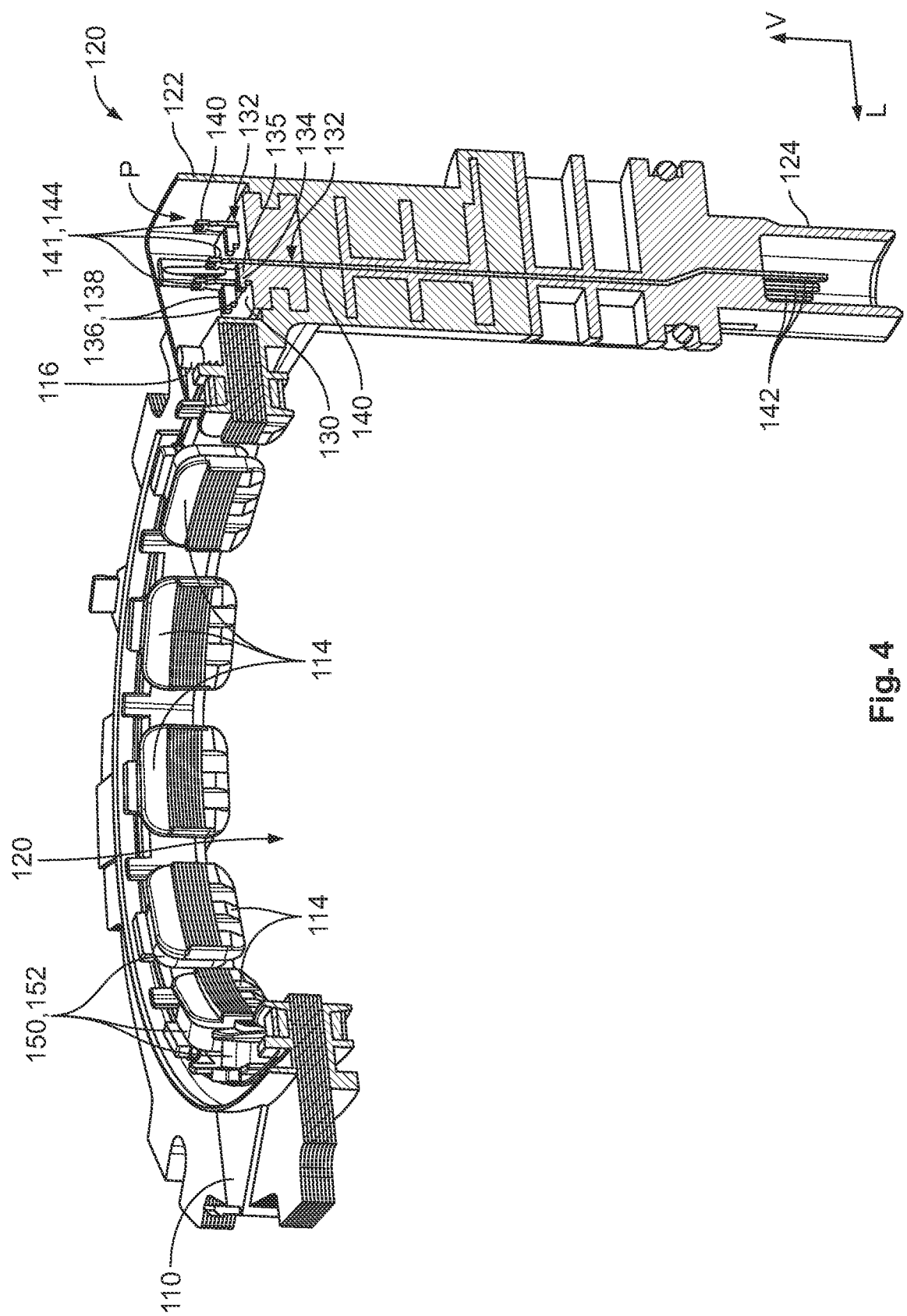
FIG. 4 is a sectional perspective view of the stator of FIG. 2.

In the embodiment of FIG. 1, the connector housing 122 is disposed on an edge of the body 110 and the connector interface 120 has a wire 123 extending between the connector housing 122 and a mating portion 124 of the connector interface 120. In another embodiment shown in FIGS. 2 and 4, the connector housing 122 is an elongated member extending in the vertical direction V perpendicular to a plane of the body 110; in this embodiment, the connector housing 122 extends continuously to the mating portion 124 and no wire is positioned between the connector housing 122 and the mating portion 124, as shown in FIG. 4. The connector interface 120 will be explained in detail with reference to the embodiment shown in FIGS. 2-4, however, in other embodiments, the connector housing 122 could alternatively extend in other directions to the mating portion 124, including to the left, right, or flat in a plane of the body 110. In all embodiments of the connector interface 120, the features of the terminal base 130 and the terminals 140 are the same as described herein.

As shown in FIG. 2, the connector housing 122 includes a cover 126 covering an end of the connector housing 122 in the vertical direction V. The connector housing 122 of FIG. 2 is shown with the cover 126 removed in FIG. 3; the cover 126 covers and protects the terminals 140 disposed in the terminal base 130. In an embodiment, the cover 126 is a separate piece that is installed over the posts 116. In another embodiments, the cover 126 is a potting that is filled and solidified within the end of the connector housing 122.

The terminal base 130, as shown in FIGS. 3 and 4, has a plurality of terminal passageways 132 extending through the terminal base 130 in the vertical direction V and a hook pin 134 positioned adjacent to each of the terminal passageways 132. Each of the hook pins 134 extends from a first end 135 adjacent to the terminal passageway 132 to a second end 136 opposite the first end 135 in a longitudinal direction L perpendicular to the vertical direction V. Each of the hook pins 134 has a protrusion 138 at the second end 136 that extends at a distance above the terminal base 130 in the vertical direction V. The terminal base 130 is formed of an insulative material and, in the shown embodiment, the hook pins 134 are each monolithically formed in a single piece with the terminal base 130.

As shown in FIGS. 3 and 4, the terminals 140 each have a termination end 141 and a mating end 142 opposite the termination end 141. The terminals 140 each have a wire termination 144 at the termination end 141 that is capable of mechanically and electrically connecting the terminal 140 to a conductive element, such as a wire. In the shown embodiment, the wire termination 144 is a fork contact that can be welded. In other embodiments, the wire termination 144 may be any type of termination that is capable of mechanically and electrically connecting the terminal 140 to the conductive element. The terminals 140 are each formed of a conductive material and, in the shown embodiment, are monolithically formed in a single piece extending from the termination end 141 to the mating end 142.

A process of assembling the stator 100 will now be described in greater detail.

The terminals 140 are initially positioned in the terminal passageways 132 of the terminal base 130 in a pre-bent state P of the terminals 140, as shown in FIG. 4. The termination end 141 of each of the terminals 140 protrudes beyond the terminal base 130 in the vertical direction V. The mating end 142 of each of the terminals 140 is exposed in the mating portion 124 of the connector interface 120. In the shown embodiment, the stator 100 has six terminals 140 arranged in two rows. In other embodiments, the stator 100 could have any number of terminals 140 arranged in any number of rows, with a corresponding number of terminal passageways 132 and hook pins 134.

With the terminals 140 in the pre-bent state P of FIG. 4, the wires 150 are positioned in the stator 100. The wires 150 each have a pole end 152 wrapped around one of the poles 114 of the body 110. The pole ends 152 of the wires 150 are shown schematically around the poles 114 in FIGS. 1, 2, and 4 for clarity of the drawings. In an embodiment, the wires 150 are formed of a copper material.

The wires 150, as shown in FIG. 3, extend to a terminal end 154 opposite the pole end 152. Between the pole end 152 and the terminal end 154, the wires 150 are each wrapped around one of the posts 116 of the body 110. From the post 116, each of the wires 150 leads to one of the terminals 140. A portion of each of the wires 150 between the post 116 and the terminal end 154 is positioned under and held by the protrusion 138 of one of the hook pins 134. In another embodiment, the posts 116 may be omitted and the wires 150 may lead directly from the poles 114 to the protrusion 138 of one of the hook pines 134.

The terminal end 154 of each of the wires 150 is positioned in the wire termination 144 of one of the terminals 140, as shown in FIG. 3. Each of the wires 150 is mechanically and electrically connected to one of the terminals 140 at the terminal end 154 by the wire termination 144. In the shown embodiment, each of the wires 150 is welded in the wire termination 144 of one of the terminals 140.

When the wires 150 are initially connected to the terminals 140 with the terminals 140 in the pre-bent state P, as shown in FIG. 3, the wires 150 are each in a taut state T. In the taut state T, each of the wires 150 is under tension between the pole end 152 and the terminal end 154; the wires 150 are under tension from the poles 114 to the posts 116, from the posts 116 to the protrusions 138 of the hook pins 134, and from the hook pins 134 to the wire terminations 144.

Figure 5:
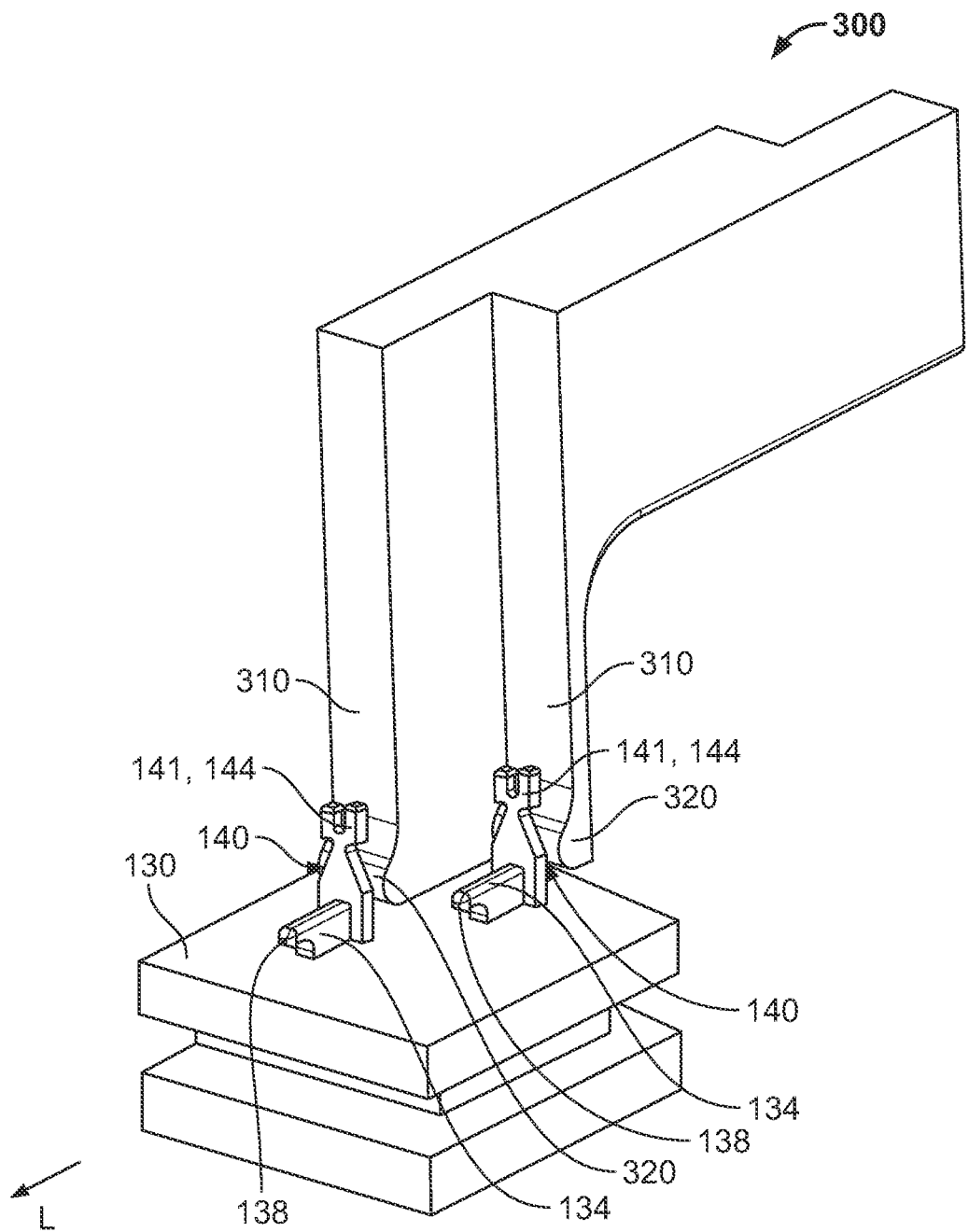
FIG. 5 is a perspective view of a bending tool according to an embodiment with terminals and a terminal base of a stator.

From the state shown in FIG. 3, in which the wires 150 are in the taut state T and the terminals 140 are in the pre-bent state P, the terminals 140 are bent to a bent state B. As shown in FIG. 5, in an embodiment, a bending tool 300 is used to simultaneously bend a plurality of the terminals 140. The terminals 140 are shown without the wires 150 and only with the terminal base 130 in FIG. 5 for clarity of the drawings, but the bending tool 300 is used to bend the terminals 140 with the wires 150 connected to the terminals 140 and positioned within the body 110 as described above with reference to FIG. 3.

The bending tool 300, as shown in the embodiment of FIG. 5, has a pair of bending arms 310 and a bending protrusion 320 disposed at an end of each of the bending arms 310. The bending tool 300 in the embodiment of FIG. 5 can be used to simultaneously bend two terminals 140 as described in detail below. In other embodiments, the bending tool 300 may have one bending arm 310 or more than two bending arms 310, with a corresponding number of bending protrusions 320, in order to bend one or any other number of terminals 140 at a time. In each of the embodiments bending the terminals 140 described in detail below, the terminals 140 may be bent to the bent state B by moving the bending tool 300 in the longitudinal direction L or may be bent to the bent state B by any other bending device or process.

Figure 6A:
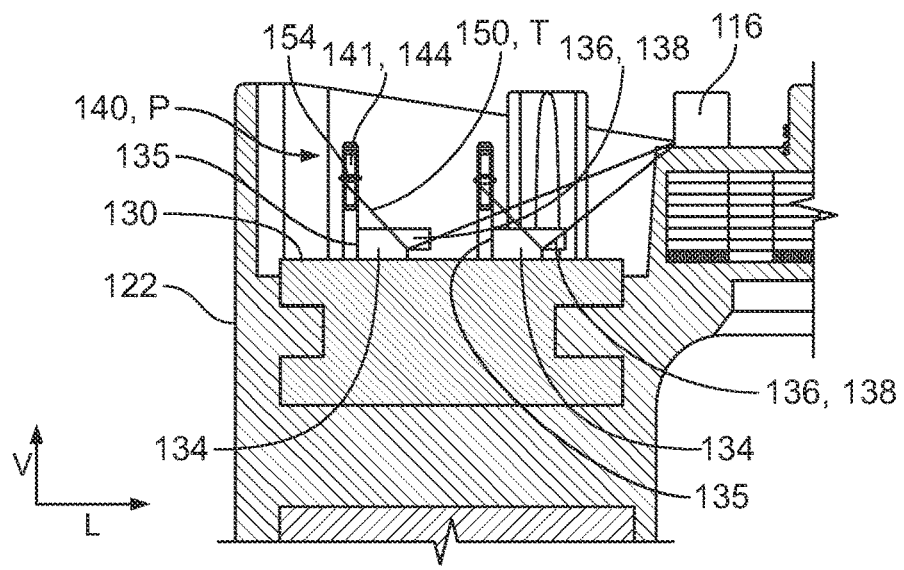
FIG. 6A is a sectional side view of a connector interface of the stator of FIG. 2 with terminals in a pre-bent state.
Figure 6B:
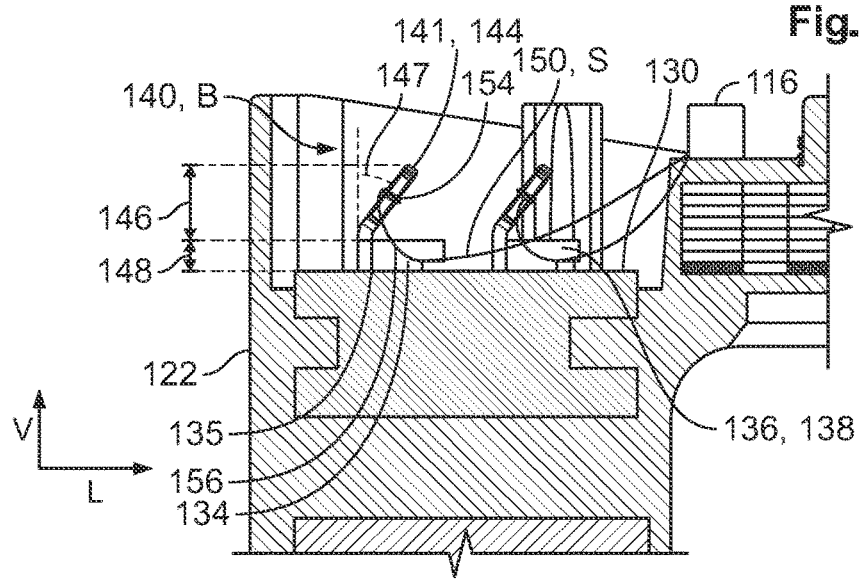
FIG. 6B is a sectional side view of the connector interface of FIG. 6A with the terminals in a bent state.

The bending of the terminals 140 shown in FIG. 3 from the pre-bent state P to the bent state B is shown in FIGS. 6A and 6B. The terminals 140 are each bent in the longitudinal direction L over the hook pin 134 that is adjacent to the terminal 140. In the bent state B shown in FIG. 6B, each of the terminals 140 has a bent section 146 at the termination end 141 that is bent to a bending angle 147 with respect to a main section 148 of the terminal 140. The bending angle 147 is greater than 0° and less than or equal to 90°. In the shown embodiment, the bending angle 147 is approximately 30°.

In the bent state B, as shown in FIG. 6B, the wire termination 144, where the terminal end 154 of the wire 150 is connected to the terminal 140, is positioned closer to the protrusion 138 of the hook pin 134 than in the pre-bent state P. The bending of the terminal 140 to the bent state B thus shortens a distance that the wire 150 extends between the protrusion 138 of the hook pin 134 and the terminal 140, allowing the wire 150 to be in a slackened state S in which the tension on the wire 150 is decreased.

A slackened portion 156 of the wire 150 is adjacent to the wire termination 144 in the bent state B, as shown in FIG. 6B, and extends at least between the wire termination 144 and the protrusion 138 of the hook pin 134. In the shown embodiment, the slackened portion 156 of the wire 150 in the slackened state S also extends between the protrusion 138 and the post 116. In all embodiments, however, the wire 150 remains taut around the poles 114 in the bent state B of the terminals 140; the slackening of the wire 150 is focused nearer to the terminals 140, in the connector interface 120.

The bending of the terminal 140 to the bent state B forms the slackened portion 156 of the wire 150 that relieves strain on the wire 150 in certain application conditions. The wire 150 with the slackened portion 156 in the slackened state S can, for example, expand and contract under rapid temperature change without increasing a tension on the wire 150 beyond a damage or breaking point. Further, the wire 150 is changed to the slackened state S without requiring an additional element of the stator 100 that must be removed after assembly; the stator 100 according to the present invention can be reliably used in a wider range of applications without requiring significant additional process steps and components, decreasing a cost of material and cost of production of the stator 100.

In the embodiment shown in FIG. 6B, the first end 135 of each of the hook pins 134 extends in the vertical direction V, perpendicular to the terminal base 130. This embodiment of the first end 135 creates the main section 148 of the terminal 140 that extends vertically above the terminal base 130, and not at the bending angle 147, when the terminal 140 is bent over the hook pin 134. In the embodiment of FIG. 6B, the terminal 140 has both the main section 138 and the bent section 146 protruding beyond the terminal base 130.

Figure 6C:
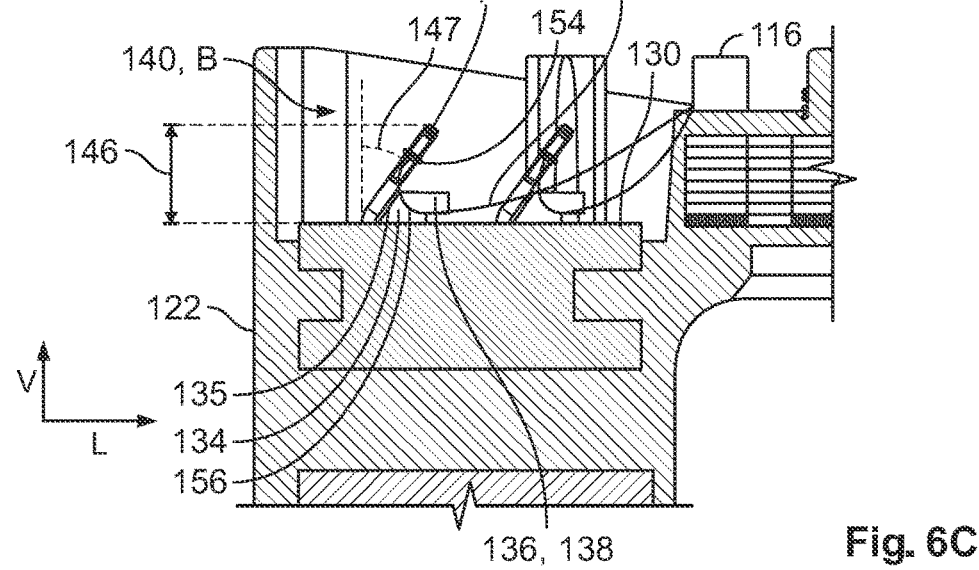
FIG. 6C is a sectional side view of a connector interface with terminals according to another embodiment in a bent state.

In another embodiment shown in FIG. 6C, the first end 135 of each of the hook pins 134 extends at an acute angle with respect to the vertical direction V. This embodiment of the first end 135 allows an entirety of the terminal 140 extending beyond the terminal base 130 to be bent to the bending angle 147 over the hook pin 134. In the embodiment of FIG. 6C, the main section 148 of the terminal 140 is disposed in the terminal base 130 and only the bent section 146 protrudes beyond the terminal base 130.

In the embodiments shown in FIGS. 3-6C, the terminals 140 each extend in a single direction beyond the terminal base 130 in the pre-bent state P; the bent section 146 is parallel to the main section 148 in the pre-bent state P. In other embodiments, shown in FIGS. 7A-8C and described in greater detail below, the terminals 140 can be formed differently in the pre-bent state P and can be bent to the bent state B to form the slackened portion 156 and the slackened state S of the wire 150.

Figure 7A:
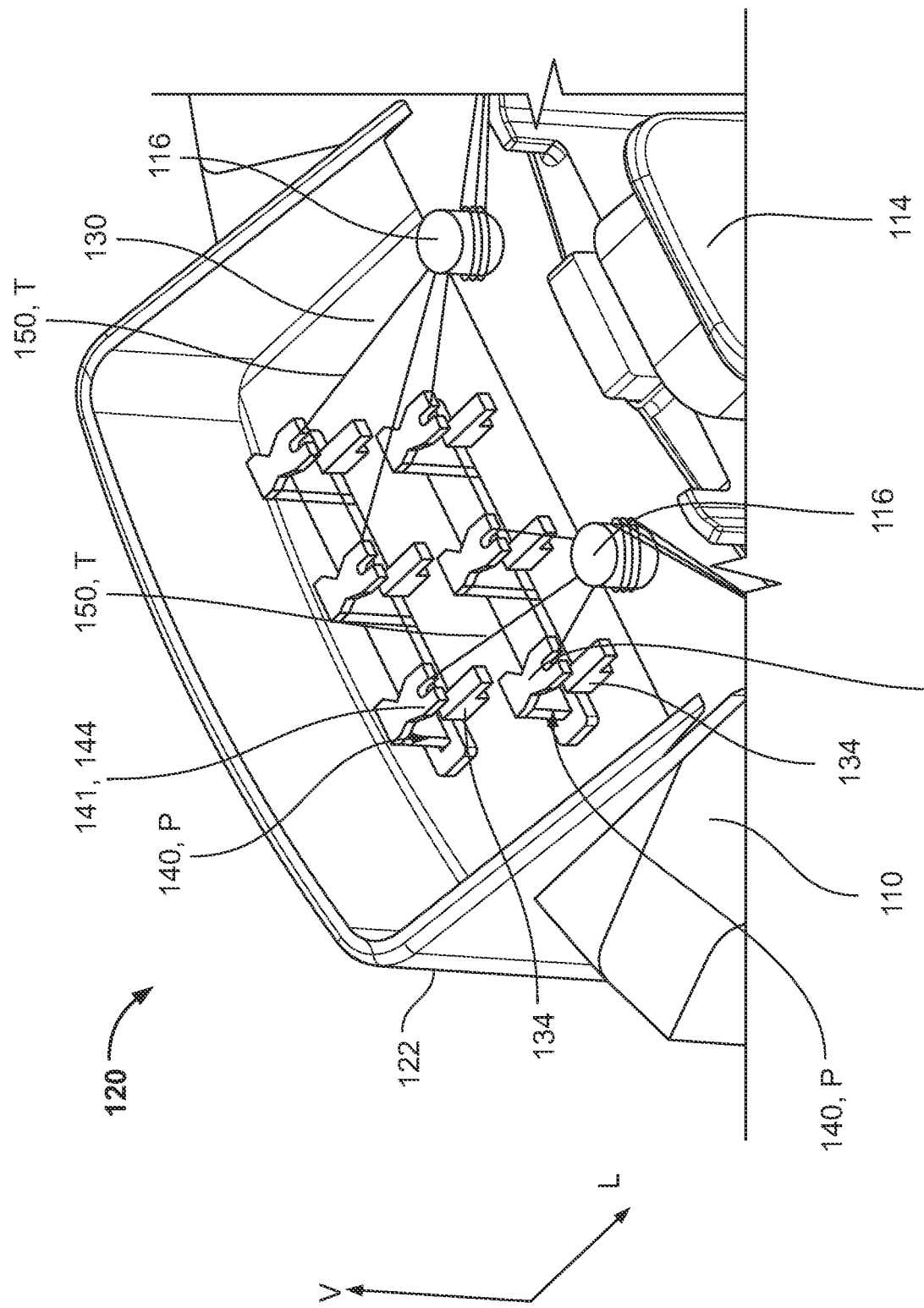
FIG. 7A is a perspective view of a connector interface having terminals according to another embodiment in a pre-bent state.
Figure 7B:
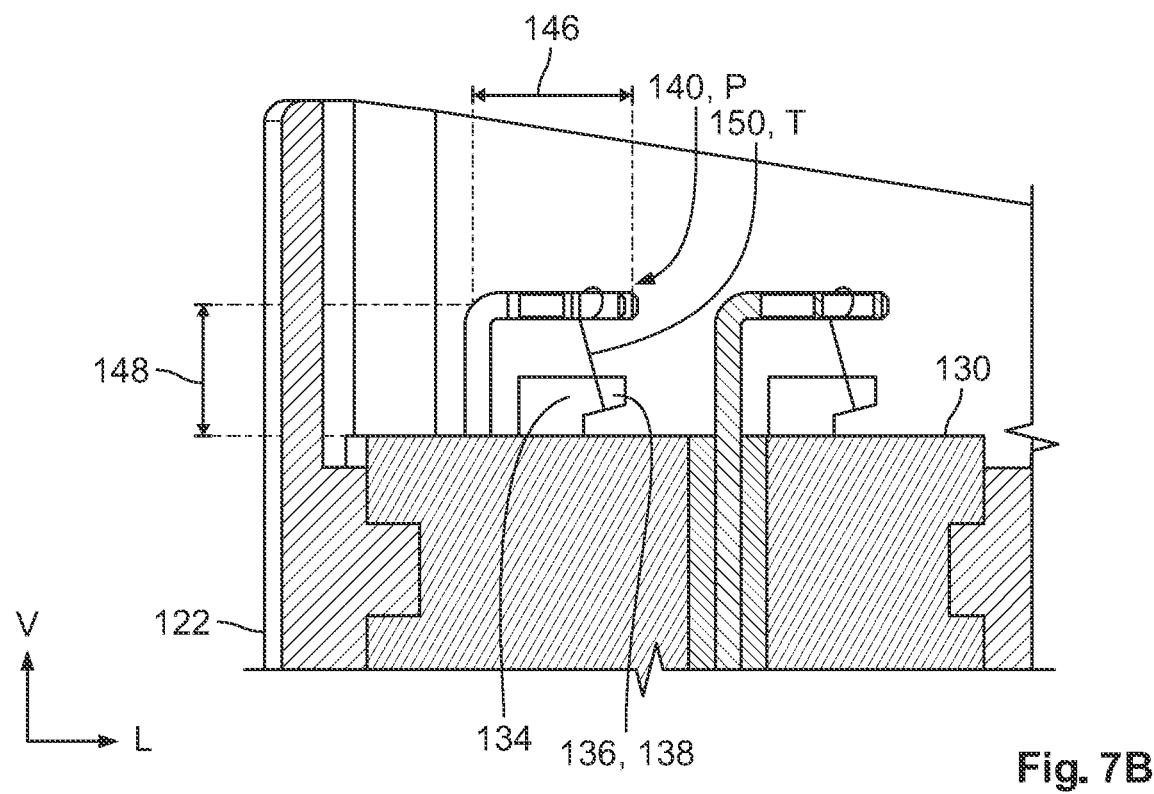
FIG. 7B is a sectional side view of the connector interface of FIG. 7A with the terminals in the pre-bent state.
Figure 7C:
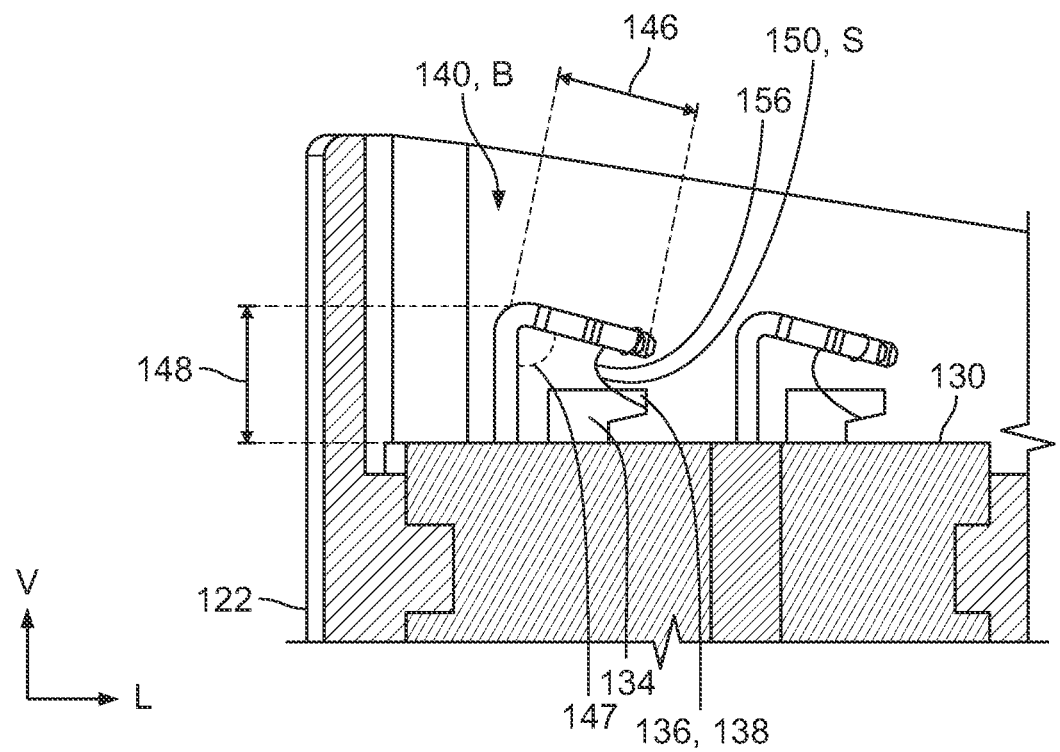
FIG. 7C is a sectional side view of the connector interface of FIG. 7B with the terminals in the bent state.

In the embodiment shown in FIGS. 7A and 7B, the bent section 146 is perpendicular to the main section 148 in the pre-bent state P. The bent section 146 in this embodiment extends over the hook pin 134 in the longitudinal direction L in the pre-bent state P. When the terminals 140 are bent to the bent state B, as shown in FIG. 7C, the bent section 146 is further bent in the vertical direction V toward the hook pin 134 to form the bending angle 147 with respect to the main section 148, forming the slackened portion 156 and the slackened state S of the wire 150.

Figure 8A:
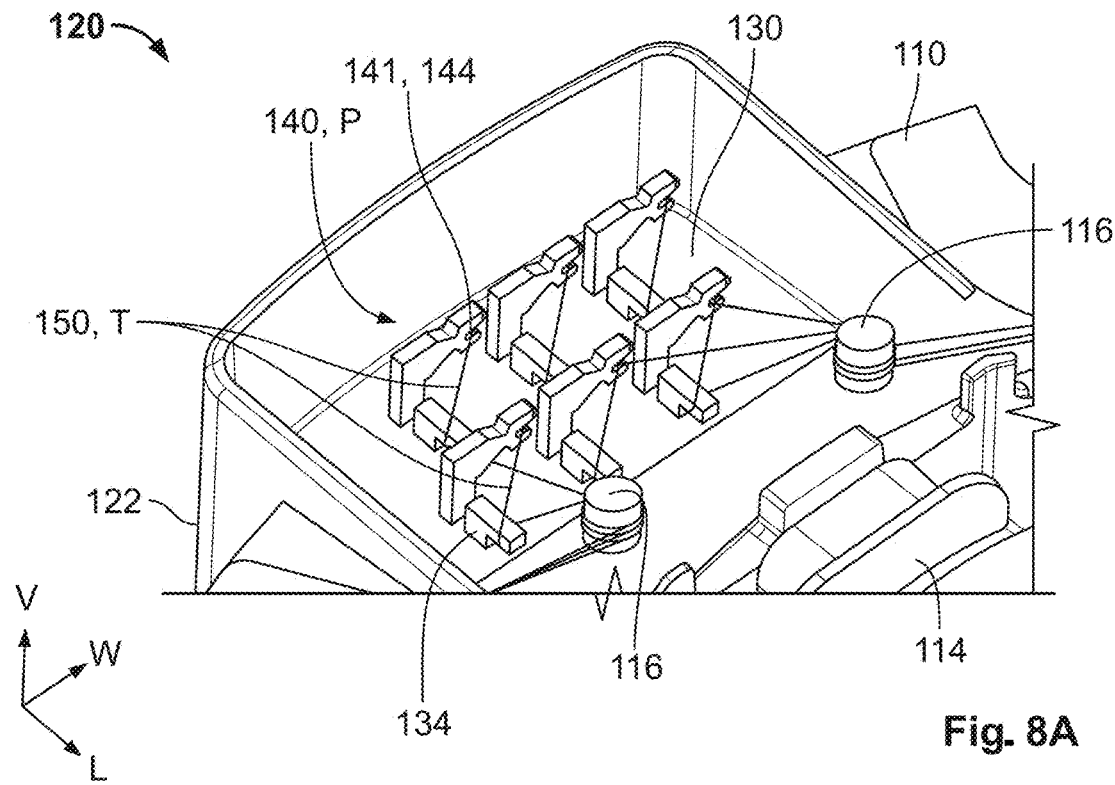
FIG. 8A is a perspective view of a connector interface having terminals according to another embodiment in a pre-bent state.
Figure 8B:
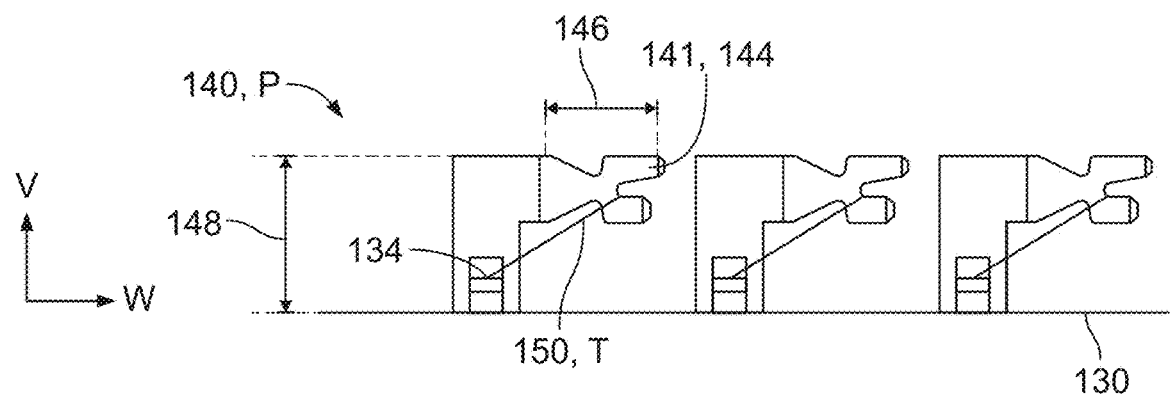
FIG. 8B is a schematic side view of the connector interface of FIG. 8A with the terminals in the pre-bent state.
Figure 8C:
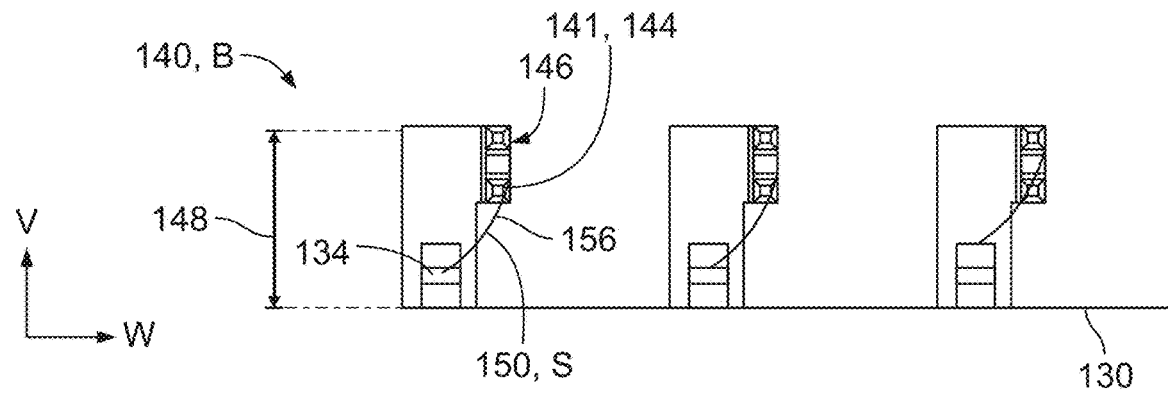
FIG. 8C is a schematic side view of the connector interface of FIG. 8B with the terminals in the bent state.

In another embodiment shown in FIGS. 8A and 8B, the bent section 146 is perpendicular to the main section 148 in the pre-bent state P, extending from the main section 148 in a width direction W perpendicular to the vertical direction V and the longitudinal direction L. When the terminals 140 are bent to the bent state B, as shown in FIG. 8C, the bent section 146 is bent into the longitudinal direction L to extend over the hook pin 134 to form the bending angle 147 perpendicular with respect to the main section 148, forming the slackened portion 156 and the slackened state S of the wire 150.

What is claimed is:

1. A stator, comprising:
   a body having a pole;
   a connector interface disposed in a portion of the body and including a terminal having a wire termination at a termination end, the terminal has a bent section at the termination end that is bent to a bending angle greater than 0° and less than or equal to 90° with respect to a main section of the terminal, the connector interface has a terminal base with a terminal passageway extending through the terminal base, the terminal is disposed in the terminal passageway and the termination end of the terminal with the bent section protrudes beyond the terminal base, the terminal base has a hook pin adjacent to the terminal in the terminal passageway, the hook pin has a protrusion at an end opposite the terminal passageway; and
   a wire disposed around the pole and extending to the termination end of the terminal, the wire is electrically and mechanically connected with the terminal at the wire termination, the bent section of the terminal forms a slackened portion of the wire adjacent to the wire termination, the bent section has a pre-bent state and a bent state, the bent section has the bending angle in the bent state, the wire termination is positioned closer to the protrusion of the hook pin in the bent state than in the pre-bent state.

2. The stator of claim 1, wherein a portion of the wire between the pole and the wire termination is held by the protrusion of the hook pin.

3. The stator of claim 2, wherein the slackened portion of the wire is between the wire termination and the protrusion of the hook pin.

4. The stator of claim 1, wherein the bent section of the terminal extends over the hook pin.

5. The stator of claim 1, wherein the bent section is parallel to the main section of the terminal in the pre-bent state.

6. The stator of claim 1, wherein the bent section is perpendicular to the main section of the terminal in the pre-bent state.

7. The stator of claim 1, wherein only the bent section of the terminal protrudes beyond the terminal base.

8. The stator of claim 1, wherein the terminal extends through the connector interface and has a mating end opposite the termination end, the terminal is monolithically formed in a single piece extending from the termination end to the mating end.

9. The stator of claim 1, wherein the pole is one of a plurality of poles of the body, the terminal is one of a plurality of terminals, and the wire is one of a plurality of wires, each of the wires is disposed around one of the poles and extends to the termination end of one of the terminals, each of the wires has the slackened portion adjacent to one of the terminals that is formed by the bent section of the one of the terminals.

10. A resolver, comprising:
a stator including a body having a pole, a connector interface disposed in a portion of the body, and a wire disposed around the pole, the connector interface includes a terminal having a termination end with a wire termination, the terminal has a bent section at the termination end that is bent to a bending angle greater than 0° and less than or equal to 90° with respect to a main section of the terminal, the connector interface has a terminal base with a terminal passageway extending through the terminal base, the terminal is disposed in the terminal passageway and the termination end of the terminal with the bent section protrudes beyond the terminal base, the terminal base has a hook pin adjacent to the terminal in the terminal passageway, the hook pin has a protrusion at an end opposite the terminal passageway, the wire extends to the termination end of the terminal and is electrically and mechanically connected with the terminal at the wire termination, the bent section of the terminal forms a slackened portion of the wire adjacent to the wire termination, the bent section has a pre-bent state and a bent state, the bent section has the bending angle in the bent state, the wire termination is positioned closer to the protrusion of the hook pin in the bent state than in the pre-bent state.

11. The resolver of claim 10, wherein the body is an approximately circular member defining a rotor receiving space, and further comprising a rotor disposed in the rotor receiving space, the rotor is rotatable with respect to the stator.

12. A method of forming a slackened portion of a wire in a stator, comprising:
providing a stator having a body with a pole and a connector interface disposed in a portion of the body, the connector interface includes a terminal having a wire termination at a termination end;
positioning the wire around the pole and extending to the termination end of the terminal, the wire is electrically and mechanically connected with the terminal at the wire termination with the wire in a taut state and the terminal in a pre-bent state; and
bending the terminal from the pre-bent state to a bent state, the bending of the terminal to the bent state slackens the wire to a slackened state in which the wire has a slackened portion adjacent to the wire termination.

13. The method of claim 12, wherein a bending tool is used to bend the terminal to the bent state in the bending step.

14. The method of claim 12, wherein the bending step bends a bent section of the terminal to a bending angle greater than 0° and less than or equal to 90° with respect to a main section of the terminal.

15. The method of claim 12, wherein the connector interface has a terminal base with a terminal passageway extending through the terminal base and a hook pin adjacent to the terminal passageway, the hook pin has a protrusion at an end opposite the terminal passageway.

16. The method of claim 15, wherein the terminal is bent in the bending step in a direction toward the protrusion and over the hook pin.

17. The method of claim 15, wherein the bending step positions the wire termination closer to the protrusion of the hook pin to form the slackened portion of the wire.

* * * * *